June 27, 1950   R. GALBRAITH ET AL   2,512,929
GLASS DECORATING PROCESS
Filed Nov. 5, 1946
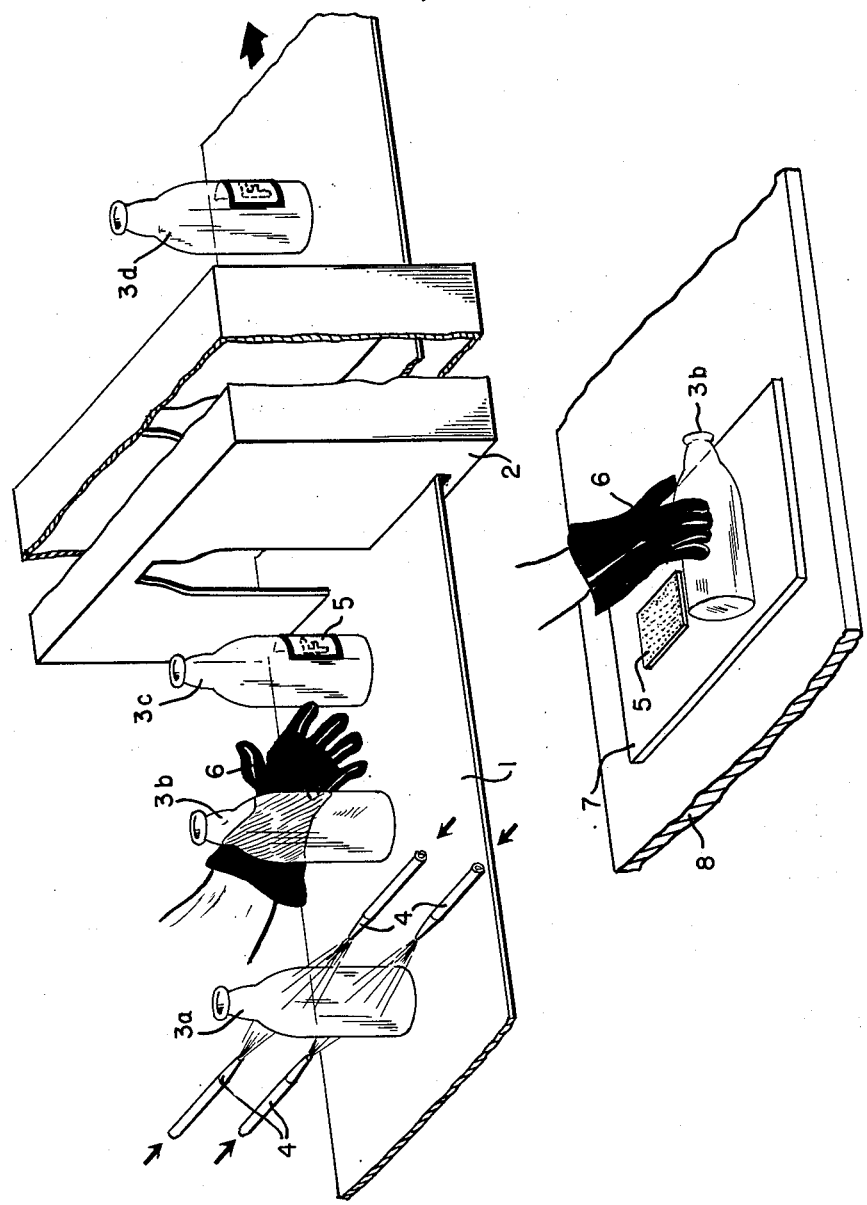
Robert Galbraith
Oliver A. Short
INVENTORS
BY *Louis A. Wiebe*
ATTORNEY Patented June 27, 1950

2,512,929

UNITED STATES PATENT OFFICE 2,512,929

GLASS DECORATING PROCESS

Robert Galbraith, Wilmington, Del., and Oliver Alton Short, Staten Island, N. Y., assignors to E. I. du Pont de Nemours & Company, Wilmington, Del., a corporation of Delaware Application November 5, 1946, Serial No. 707,990

3 Claims. (Cl. 49—79)

This invention relates to a process for the decoration of glass articles, and more particularly it relates to a process for the decoration with ceramic colors of glass articles produced in a forming mold, for example, bottles and the like, which are, in the normal course of manufacture, passed from the forming apparatus through an annealing lehr.

Glass bottles and certain other glass articles which are produced in large quantities are commonly produced by forming the same in a glass-forming mold. The glass articles, when produced in this manner, in order to prevent the setting up therein of undue strains, are passed from the forming mold through an annealing lehr. The usual annealing lehr has an entering temperature of the order of 590° C. to 700° C., and an exit temperature well below the temperature at which strains are set up in the glass upon further cooling, for example, an exit temperature of the order of 30° C. to 60° C.

It is also common practice to decorate glass articles produced in the above-described manner with ceramic colors, i. e., colors composed of glass enamel frit mixed with color pigments. This is usually practiced by applying to the bottles, or the like, cooled substantially to the temperature of the surrounding atmosphere after passing from the annealing lehr, the ceramic colors in the form of the desired design. This may be done by direct application of the colors to the glassware, for example, by a screen-squeegee process, or by first fabricating a self-sustaining decorative label comprising a thin, organic, self-sustaining sheet or film containing the desired design in ceramic colors thereon, and applying the label on the glass article with an adhesive. The bottle or other form of glassware is then fired to incorporate the ceramic colors thereon, and again annealing the glass articles.

The decoration of bottles and the like in the manner above-described is relatively expensive and time-consuming by reason of the fact that the glass article must be twice subjected to an annealing operation. In the manufacture of glassware having a size and glass thickness of the order of a common milk bottle, beer bottle, or soft drink bottle, each annealing operation has heretofore required a cooling period of two hours, or longer. Many attempts have been made to eliminate one annealing operation by applying a label containing the ceramic colors to the glass article between the forming mold and the annealing lehr. Such attempts have not been successful heretofore. Ceramic color labels cannot readily be applied to the bottle at the temperature thereof between the forming mold and the entrance to the annealing lehr without objectionably distorting the label or cracking the glass. At the temperature of the glass article between the forming mold and the annealing lehr, hot air currents of considerable magnitude flow from the article outwardly, and attempts to press a ceramic color label to the bottle against these air currents is difficult to carry out without causing an objectionable and unavoidable distortion and poor adherence of the label on the article.

It is an object of this invention to provide an improved process for the application of ceramic colors to a mold-formed glass article between the forming mold and the annealing lehr.

It is another object of this invention to provide an improved process for applying a self-supporting film containing ceramic colors in the desired form and design on a mold-formed glass article between the forming operation and the annealing operation.

Other objects of the invention will appear hereinafter.

The objects of this invention may be accomplished, in general, by cooling glassware having a size and glass thickness of the order of milk bottles, beer bottles, and soft drink bottles, immediately after fabrication in a glass-forming mold, within a period of two to twenty minutes to a temperature of 40° C. to 150° C. by directing cooling air currents in contact with said glassware, applying the ceramic color label to the glassware, and passing the labeled glassware into an annealing lehr having a temperature sufficiently high to fire and fuse the enamel in the ceramic color label.

The above-said quick cooling operation to which the glassware is subjected immediately after the glass molding operation may be carried out in such a manner as to cool the entire glassware surface, or only that section or area of the glassware to which the ceramic color label will be applied. If the entire glassware surface is to be cooled, cooling air currents are preferably directed around the glassware, as the latter passes through a cooling tunnel, the air being directed with sufficient force and volume to cool the ware to the desired temperature, between 40° C. and 150° C., within the desired period of time, between two minutes and twenty minutes. The force and volume of the air currents necessary to accomplish this can be readily determined by measuring the temperature of the glassware passing through the tunnel within the chosen time period, and adjusting the air currents accordingly.

If only the approximate label area of the glassware is to be cooled, air blasts or air jets are preferably directed only in contact with the general section or area of the bottle to be cooled. The air blasts are adjusted to pass air in force and volume sufficient to cool the label area to the desired temperature between the above-said limits, within the time period chosen between the limits given above. In this case, the bottles, or other glassware, need not be confined within an enclosure such as a tunnel, but they may be cooled as they pass on an open conveyor. After the label area of the bottles has been cooled to a temperature between 40° C. and 150° C., the preformed label is immediately applied before heat from the hotter parts of the bottle has heated the label area above 150° C. At a temperature below 150° C. the label may be applied without objectionable distortion or poor adhesion.

The cooling current of air used in cooling the glassware in accordance with this invention may be air substantially at room temperature (20° C.), or it may be air having an elevated temperature, for example, air having a temperature of 20° C. to 90° C. If the air has an elevated temperature, it can be more safely passed in contact with the article at a higher pressure. This does not, however, appear to be of great importance since air at room temperature has been safely passed into contact with a hot glass article having the temperature at which it comes from the forming mold at a jet pressure of over thirty pounds per square inch.

Jet cooling of glassware can be obtained by passing air at room temperature and ten to forty pounds per square inch pressure into contact with the glassware. The glassware immediately after cooling should preferably have a temperature of between 40° C. and 150° C. A lower temperature than 40° C. will endanger the setting up of objectionable strains in the glass and a temperature above 150° C. will endanger film or label distortion from heat currents. As above stated, when only the label area of glassware is cooled, the label, i. e., the ceramic color-bearing film, is pressed into contact with the label area of the article immediately after the temporary cooling of this area, before a substantial amount of heat has migrated from the hotter parts of the article to the cooled area. The film or label can be applied by hand with proper heat shielding and use of asbestos gloves, for example, ceramic color labels have been applied by rolling the hot bottle over a label resting on a rubber pad, using asbestos gloves to hold the bottle and apply pressure against the label. The labels may be applied by mechanical means such as employed in applying labels to cans, or the like.

Any ceramic color-bearing, self-sustaining film of organic material which will volatilize during the firing operation without objectionable gas formation and without having a carbonaceous residue can be applied to the cooled glass article by the process of the present invention, and fired to produce a design or decoration on the glass article. Such ceramic color-bearing films and labels are generally known in the art. Preferably, however, in carrying out the process of the present invention, it is greatly to be preferred to employ a ceramic color-bearing label comprising a design or decoration in ceramic colors fixed upon a self-supporting film of an alkyl methacrylate polymer, for example, a methyl methacrylate polymer, ethyl methacrylate polymer, or a normal- or iso-butyl methacrylate polymer. Such alkyl methacrylate polymers should have a molecular weight of at least 5,000, and preferably 15,000 to 50,000. It has been found that labels fabricated with a film-forming composition comprising an alkyl methacrylate polymer can be fired without objectionable gas formation, they do not leave a carbonaceous deposit upon decomposing during firing, and they do not objectionably run as the temperature is gradually raised during the firing. The firing of the labels is accomplished by the temperature encountered in the annealing lehr.

The invention will be described with reference to the accompanying illustration, which is a diagrammatic perspective view of one embodiment of apparatus suitable for use in carrying out the process of this invention.

Referring to the illustration, reference numeral 1 designates a conveying member passing through an annealing lehr 2. A bottle 3a, immediately after removal from a conventional forming mold (not shown) is positioned on conveyor 1 between air jets 4. The bottle 3a is cooled to a temperature between 40° C. and 150° C. by air passing from the air jets 4. The bottle 3b, cooled to the above-said temperature, is labeled by rolling a ceramic color label 5, positioned on rubber pad 7, onto the bottle. The label 5 will contain a temporary adhesive, and the pad 7 is positioned on table 8. This operation may be carried out by hand with asbestos gloves as illustrated. Bottle 3c bearing the color label is now passed into annealing lehr 2. The bottle is heated in the annealing lehr to a temperature which will fuse the ceramic colors in the ceramic color label and then gradually cooled to a temperature of 30° C. to 60° C. to remove strains from the glass. The finished bottle is represented by numeral 3d.

In preparing the ceramic color-bearing films and labels, it is often desired to provide a white, opaque background for the design or decoration in ceramic colors. This is readily accomplished by incorporating an opaque, white, glass enamel in the organic film-forming composition from which the film is prepared. The following two compositions are examples of film-forming compositions which have given particularly desirable results when cast in the form of films, dried, and the design in ceramic colors applied on the dry films by silk or metal or other screen squeegee stencil:

EXAMPLE I

*Butyl methacrylate film-forming composition*

30 grams normal butyl methacrylate polymer, molecular weight 20,000 to 40,000.
130 grams amyl acetate.
100 grams white glass enamel, having the following composition:
  10% $TiO_2$
  90% flux, whose melted composition is:

| | Per cent |
|---|---|
| PbO | 52.00 |
| $B_2O_3$ | 6.15 |
| $SiO_2$ | 31.00 |
| $TiO_2$ | 0.95 |
| $ZrO_2$ | 3.65 |
| ZnO | 1.98 |
| $Na_2O$ | 4.27 |
| | 100.00 |

EXAMPLE II

*Methyl methacrylate film-forming composition*

12.6 grams methyl methacrylate polymer, molecular weight 15,000 to 40,000.
57.4 grams methyl ethyl ketone.
85.0 grams 50-50, by weight, butanol-xylene mixture.
100 grams white glass enamel having the composition of the enamel in Example I.
2.0 grams dibutyl phthalate.

The ceramic color labels may be produced by casting a film of the composition of Example I or II on a glass plate or a chromium-plated steel plate which has previously been coated with a separating agent such as dilorol phosphate, sulfated higher alcohol, or the like. The film is cast using a casting blade having a clearance of 0.015 inch from the glass plate. After the film dries, the design or decoration in ceramic colors is squeegeed on the surface thereof through a screen stencil, such as a silk or metal screen stencil, or it is printed thereon. The ceramic colors are comprised of the desired colored glass enamel powder mixed in the ratio of about 3:1 with a suitable paste-forming composition. As suitable paste-forming compositions, the following may be named:

EXAMPLE III 10 grams normal butyl methacrylate polymer, molecular weight 20,000 to 40,000.
35 grams isopropyl ether of ethylene glycol.

EXAMPLE IV 16 grams normal butyl methacrylate polymer, molecular weight 20,000 to 40,000.
24 grams petroleum solvent, having a boiling range of 175° C. to 210° C.

The labels should be adhered to the ware shortly before firing with a size or adhesive which will burn clean during the firing of the colors. A suitable size for this purpose consists of 25% hydrogenated wood rosin and 75% diethylene glycol ethyl ether (2-(2-ethoxyethoxy)ethanol). The size is applied to the side of the label which is to be applied to the glass. It is preferred that the size solution be applied to the label immediately before the label is applied to the glass. This prevents the slight solvent attack of the size from damaging the film and provides a means for sweeping out air bubbles between the label and the glass. The size solvent is evaporated in the pre-heat cycle of the decorating lehr.

After the ceramic color label has been applied to the glassware, it is passed into the usual annealing lehr having an entrance temperature of 590° C. to 700° C. depending upon the fusing temperature of the glass enamel present in the color label. The glass enamel in the label must be fired or fused in the annealing lehr before the glassware is gradually cooled and annealed. As is usual in annealing lehrs for glassware, the glassware is gradually cooled over a period of two to six hours to a temperature of between 30° C. and 60° C. to remove the strains from the glassware.

Although glassware has been formed and decorated with preformed ceramic color labels for many years, it has always been considered essential to carry out this process with two separate annealing operations, in each of which the glassware was slowly cooled and annealed over a period of time exceeding two hours. Prior to this invention, it has never been considered feasible to quickly cool glassware, with the attendant strains in the ware, between the forming operation and the labeling operation. It was particularly surprising that air currents could be successfully directed against the glassware to accomplish such quick cooling without causing excessive breakage. The breakage of the glassware encountered as a result of the quick cooling operation of the present invention is usually considerably less than 5%. To find that one section of a bottle or the like could be more quickly cooled than the other sections thereof immediately after the forming thereof in a forming mold without excessive breakage was contrary to all precedent in the arts.

Reference in the specification and claims to parts, proportions and percentages, unless otherwise specified, refers to parts, proportions and percentages by weight.

Since it is obvious that many changes and modifications can be made in the above-described details without departing from the nature and spirit of the invention, it is to be understood that the invention is not to be limited to said details except as set forth in the appended claims.

What is claimed is:

1. The process of decorating glassware such as bottles fabricated in a glass-forming mold which comprises directing cooling currents of air in contact with said glassware immediately after fabrication and while said glassware has substantially the temperature of the forming mold, said air being directed with a force and volume sufficient to cool said glassware to a temperature between 40° C. and 150° C. within a period of two to twenty minutes, applying a ceramic color label comprising a self-sustaining film of an organic plastic material having thereon a design in ceramic glass enamel colors to said cooled glassware, and annealing said glassware with an initial temperature sufficiently high to fire and fuse the glass enamel in said color label.

2. The process of decorating glassware such as bottles fabricated in a glass-forming mold which comprises directing cooling currents of air in contact only with such general area of said glassware which is to bear a ceramic color decoration immediately after fabrication and while said glassware has substantially the temperature of the forming mold, said air being directed with a force and volume sufficient to cool said area to a temperature between 40° C. and 150° C. within a period of two to twenty minutes, applying a ceramic color label comprising a self-sustaining film of an organic plastic material having thereon a design in ceramic glass enamel colors to said cooled area immediately after the cooling thereof, and annealing said glassware with an initial temperature sufficiently high to fire and fuse the glass enamel in said color label.

3. The process of decorating glassware such as bottles fabricated in a glass-forming mold which comprises directing cooling currents of air in contact with the entire surface of said glassware immediately after fabrication and while said glassware has substantially the temperature of the forming mold, said air being directed with a force and volume sufficient to cool said glassware to a temperature between 40° C. and 150° C. within a period of two to twenty minutes, applying a ceramic color label comprising a self-sustaining film of an organic plastic material having thereon a design in ceramic glass enamel colors to said cooled glassware, and annealing said glassware with an initial temperature sufficiently high to fire and fuse the glass enamel in said color label.

ROBERT GALBRAITH.
OLIVER ALTON SHORT.

REFERENCES CITED

The following references are of record in the file of this patent:

UNITED STATES PATENTS

| Number | Name | Date |
| --- | --- | --- |
| 1,767,108 | Zeh | June 24, 1930 |
| 2,067,949 | Rez | Jan. 19, 1937 |
| 2,282,848 | Berthold | May 12, 1942 |